United States Patent
Jamison et al.

(10) Patent No.: US 7,441,805 B2
(45) Date of Patent: Oct. 28, 2008

(54) CUSHION BREAK STITCH PATTERN

(75) Inventors: Patrick Jamison, North Ogden, UT (US); Greg Waters, Riverdale, UT (US); Yuichi Inuzuka, Okazaki (JP)

(73) Assignee: Autoliv ASP, Inc., Ogden, UT (US)

( * ) Notice: Subject to any disclaimer, the term of this patent is extended or adjusted under 35 U.S.C. 154(b) by 263 days.

(21) Appl. No.: 11/324,595

(22) Filed: Jan. 3, 2006

(65) Prior Publication Data

US 2007/0152435 A1    Jul. 5, 2007

(51) Int. Cl.
  *B60R 21/16*    (2006.01)
(52) U.S. Cl. .................... 280/743.2; 280/730.1
(58) Field of Classification Search ......... 280/731, 280/743.1, 743.2, 730.1
  See application file for complete search history.

(56) References Cited

U.S. PATENT DOCUMENTS

| 5,306,043 | A | * | 4/1994 | Mihm et al. | ........... 280/732 |
| 5,308,113 | A | * | 5/1994 | Moriset | ........... 280/743.2 |
| 5,405,166 | A | * | 4/1995 | Rogerson | ........... 280/739 |
| 5,454,595 | A | | 10/1995 | Olson et al. | ........... 280/743.1 |
| 5,732,973 | A | * | 3/1998 | Turnbull et al. | ........... 280/743.1 |
| 5,979,937 | A | * | 11/1999 | Yoshida et al. | ........... 280/743.2 |
| 6,454,300 | B1 | * | 9/2002 | Dunkle et al. | ........... 280/742 |
| 6,616,184 | B2 | * | 9/2003 | Fischer | ........... 280/743.2 |
| 7,134,691 | B2 | * | 11/2006 | Dunkle et al. | ........... 280/743.2 |
| 2003/0168842 | A1 | * | 9/2003 | Igawa | ........... 280/743.2 |
| 2005/0127653 | A1 | * | 6/2005 | Williams et al. | ........... 280/743.2 |
| 2005/0161918 | A1 | * | 7/2005 | Bito | ........... 280/732 |
| 2006/0175819 | A1 | * | 8/2006 | Abe | ........... 280/743.2 |

* cited by examiner

*Primary Examiner*—Toan C To
(74) *Attorney, Agent, or Firm*—Sally J Brown; Stoel Rives LLP (57) ABSTRACT

Disclosed are embodiments of airbag cushion which deploys sequentially to have an initial volume to push an occupant away from an instrument panel and then a final volume.

18 Claims, 10 Drawing Sheets

CUSHION BREAK STITCH PATTERN

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

DETAILED DESCRIPTION OF PREFERRED EMBODIMENTS

Described below are embodiments of automotive airbags which expand in phases. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, steps, or characteristics may be combined in any suitable manner in one or more embodiments.

Inventive airbag assemblies are disclosed having desirable inflation characteristics as are methods for sequentially inflating portions of an airbag cushion. For instance, in many of the above-described embodiments, the top portion of the airbag cushion and the side portions deploy first followed by portion corresponding with the head of an occupant. This inflation sequence enables the occupant's shoulders to be pushed back followed by the occupant's head. Finally, the airbag cushion continues to expand downward from the top to the bottom of the occupant's torso. This is a desirable inflation scenario for some applications, particularly out-of-position occupants, such as an occupant leaning towards an instrument panel. One advantage of this sequential deployment is that a portion of the airbag cushion is kept close to an instrument panel and permits the occupant to be pushed away from the instrument panel in a manner which protects the occupant's head and neck. Also, the sequential deployment avoids pushing down on the head of an occupant sitting very close to the instrument panel, thereby minimizing the likelihood of compressing the neck of the occupant.

Figure 4A:
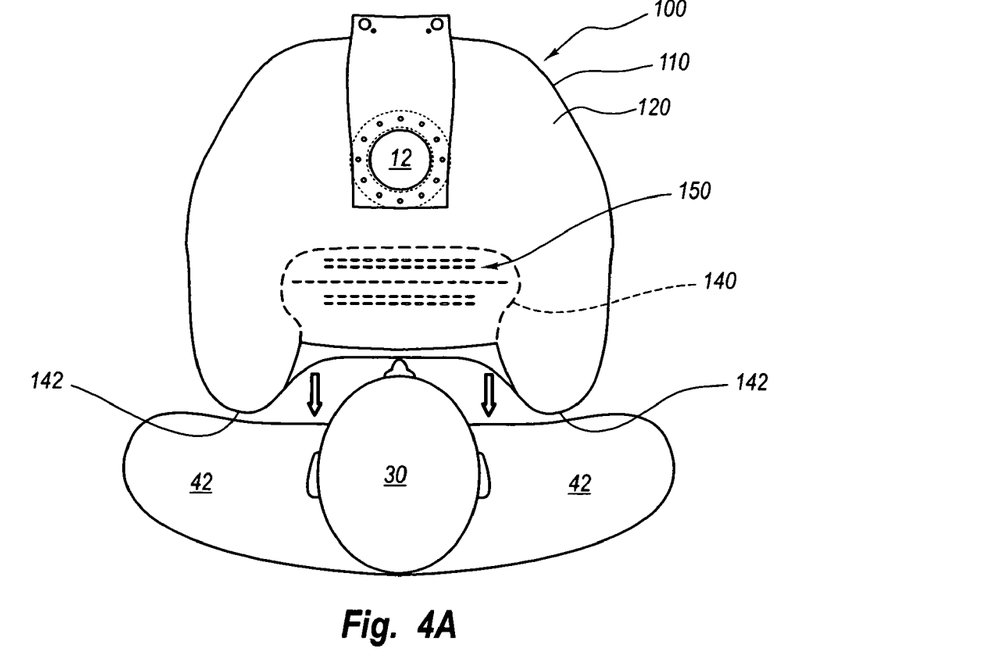
FIG. 4A is a top plan view of another embodiment of the airbag cushion assembly during initial expansion of the airbag before contacting the shoulders of the occupant.
Figure 4B:
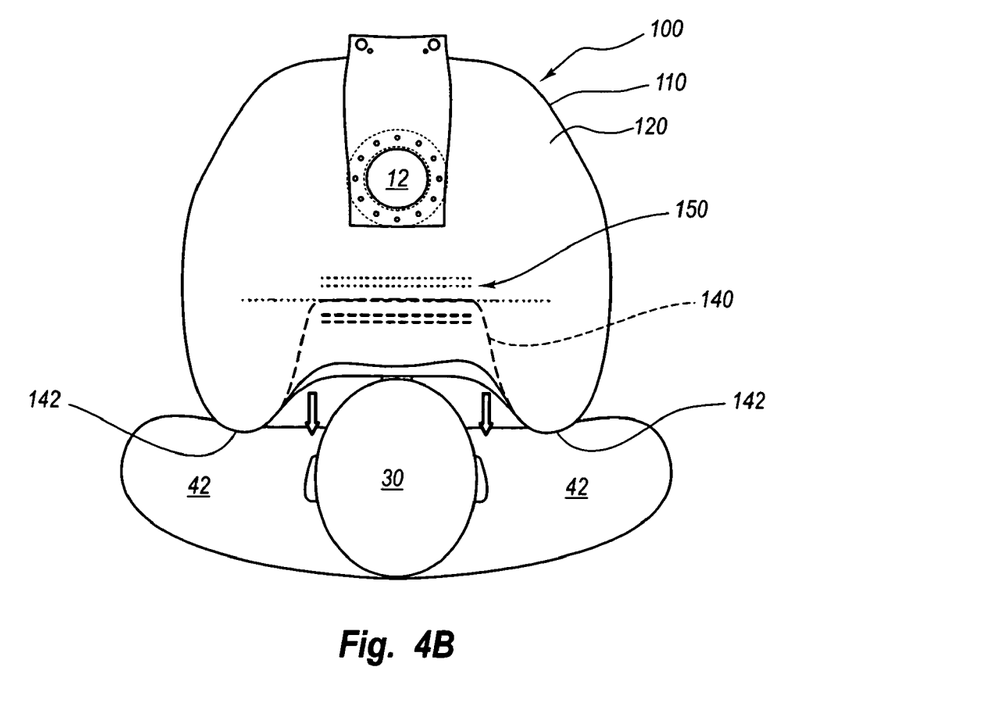
FIG. 4B is a top plan view of the airbag cushion assembly of FIG. 4A after initial expansion of the airbag to show the contact with the shoulders and the recessed area opposing the occupant's head.
Figure 4C:
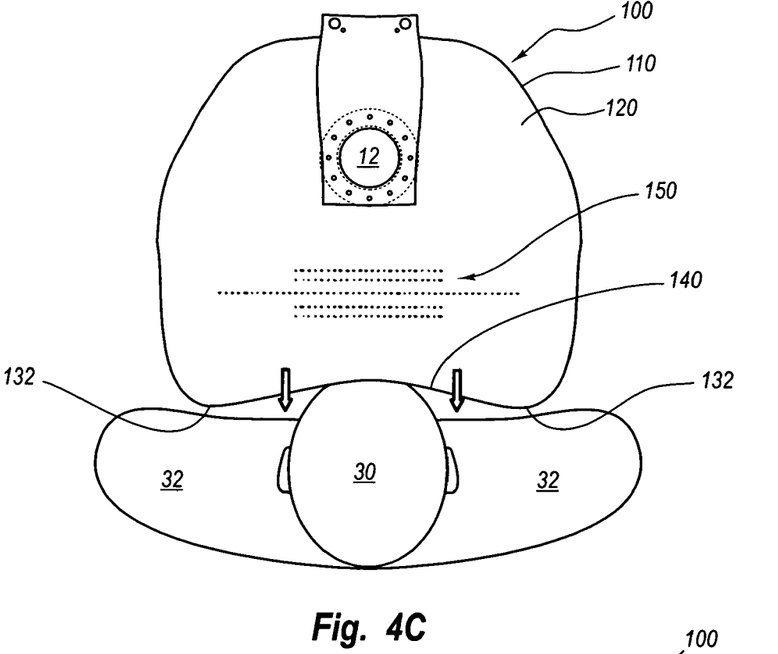
FIG. 4C is a top plan view of the airbag cushion assembly of FIGS. 4A and 4B after complete expansion of the airbag to show the contact with the shoulders and the occupant's head.

FIGS. 1A-1D depict an airbag cushion assembly comprising an inflator module 10 and an airbag cushion 100. Inflator module 10 has an exit port 12 which is best seen in FIGS. 4A-4C.

Airbag cushion 100 has cushion wall 110. Throat 112 of airbag cushion wall 110 is disposed around mouth 12 of inflator module 10. Cushion wall 110 has an interior surface 114 and an exterior surface 116. Interior 120 of cushion 100 has a volume defined by cushion wall 110 for inflation by gas from an inflator.

Cushion wall 110 comprises an initial expansion section 130 and full expansion section 140. Full expansion portion 140 is expanded once threads 150 break. The bracket in FIGS. 1B-1D identifies initial expansion section 130. The remainder of cushion wall 110, the section outside of the bracket, is the full expansion portion 140.

Figure 1A:
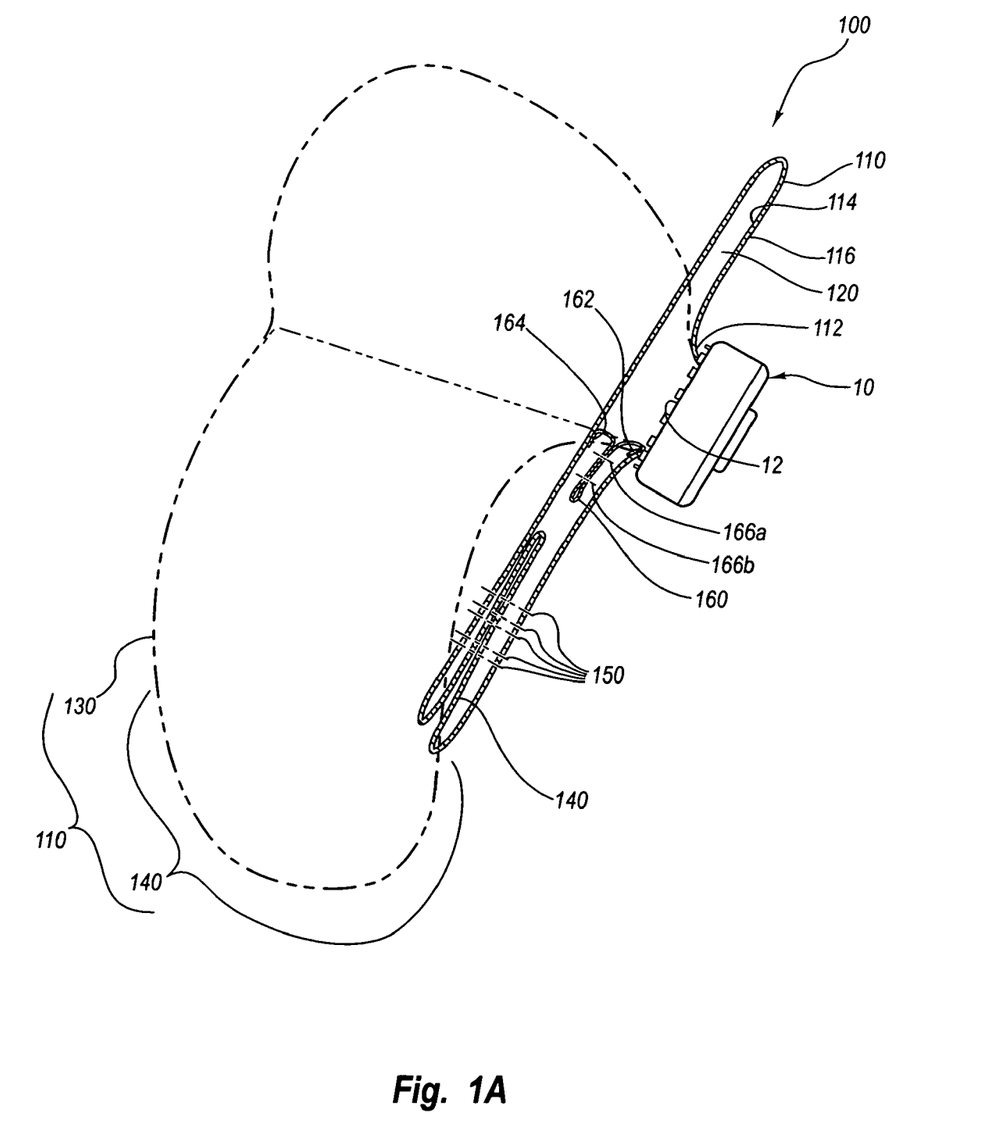
FIG. 1A is a cross-sectional view of an embodiment of an airbag cushion assembly which shows the unexploded bag and the exploded bag in phantom.

An optional tether 160 is shown attached at its opposing ends 162 and 164 to interior surface 114 of cushion wall 110. Tether 160 has optional tether stitches 166a and may also have other optional stitches 166b which are design to break when a predetermined level of force is applied against cushion wall 110 due to the inflation gas.

Figure 1B:
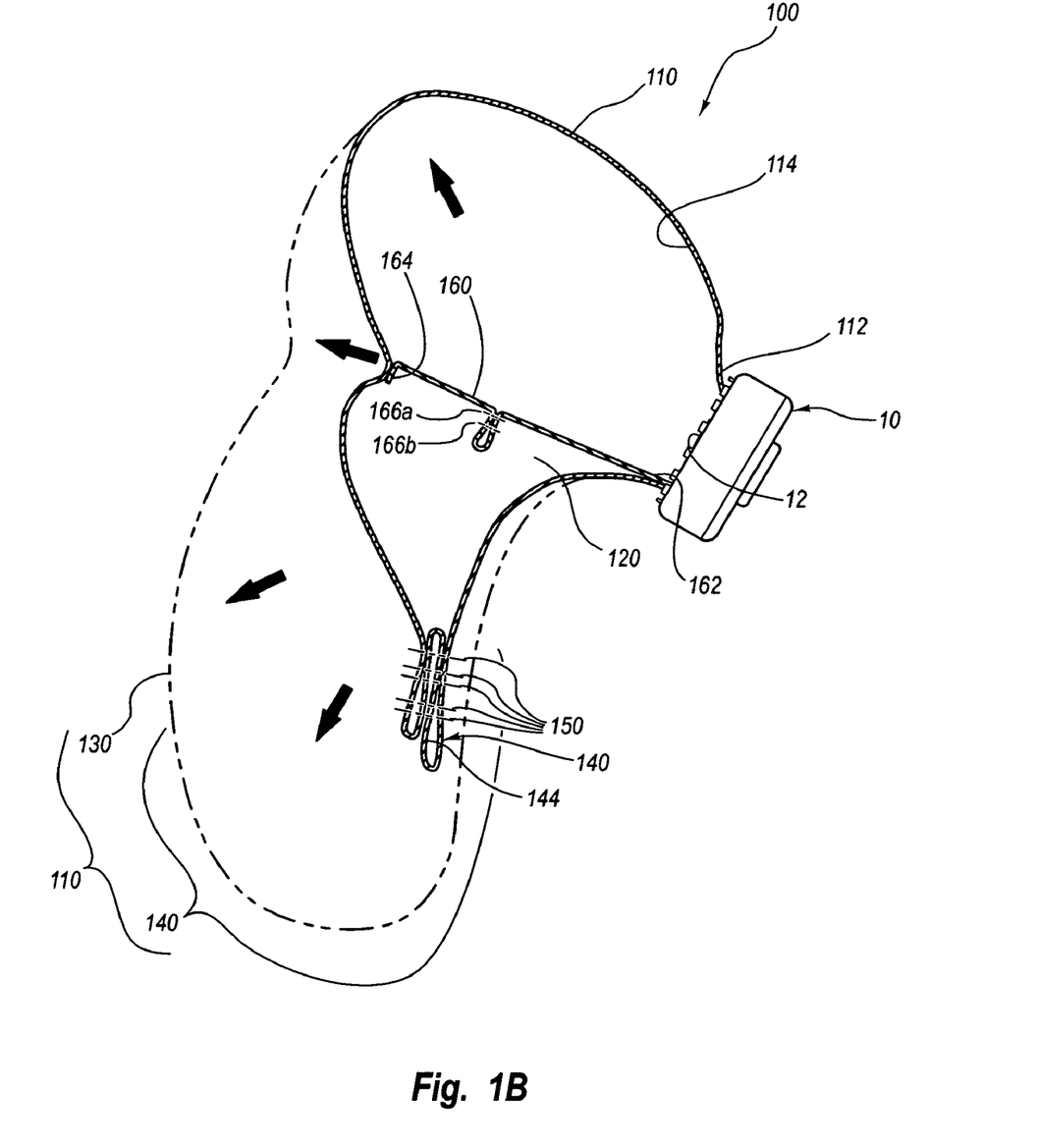
FIG. 1B is a cross-sectional view of the airbag cushion assembly shown in FIG. 1A showing the top portion of the bag filled with gas and straining the stitches.

FIG. 1B shows initial expansion section 130 expanded after gas enters interior 120 of airbag cushion 100 via inflator 10. Tether 160 is taut but ruptureable stitches 166a-b have not yet been ruptured. Full expansion section 140 is still collapsed as threads 150 have not yet been broken.

Figure 1C:
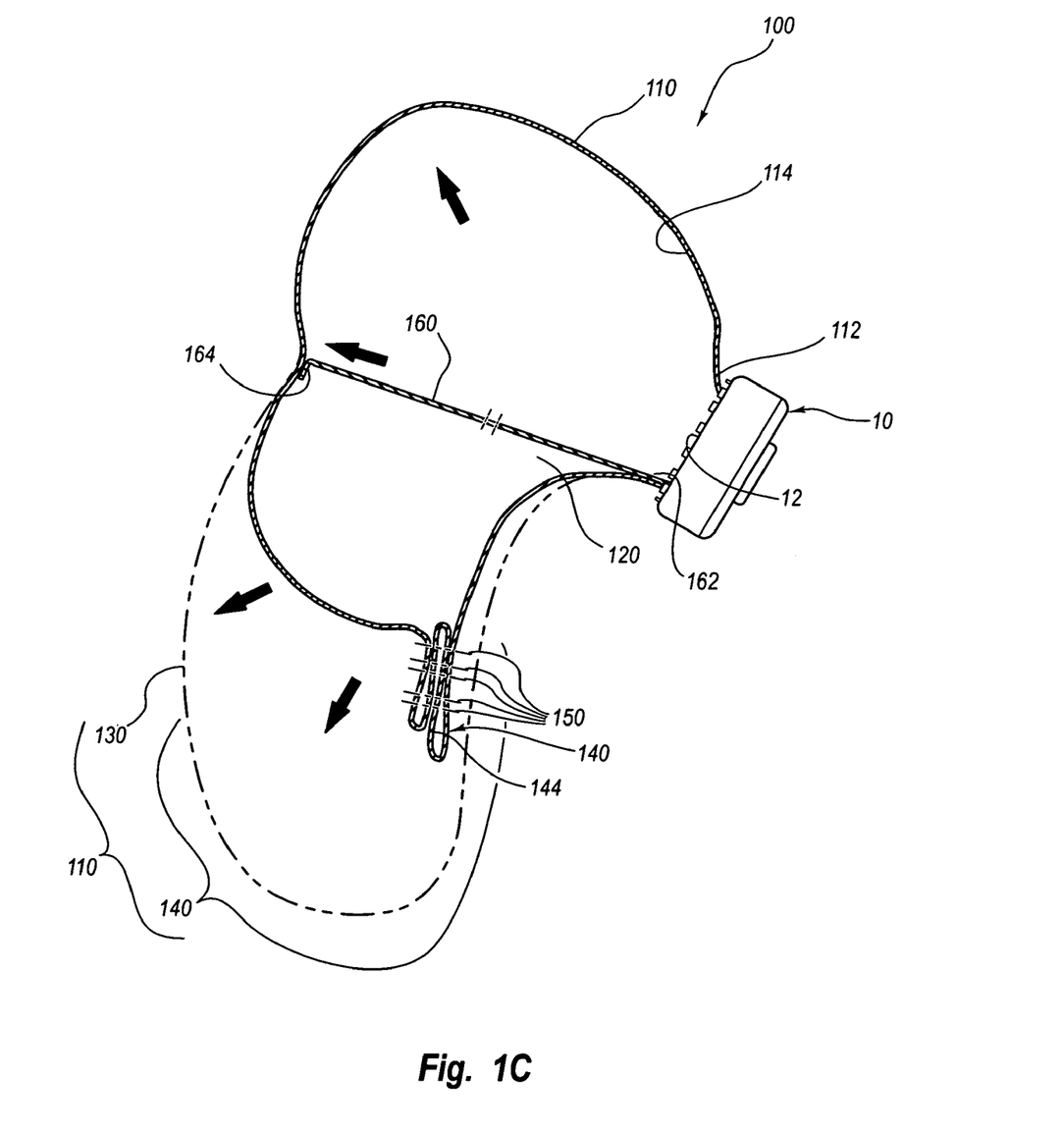
FIG. 1C is a cross-sectional view of the airbag cushion assembly shown in FIGS. 1A-1B assembly after the tether stitches have been broken.

In FIG. 1C, tether 160 is shown after stitches 166a-b have been broken. The gas is straining stitches 150 but full expansion section 140 is still collapsed. Note that the folding pattern of full expansion section 140 may have other configurations.

Figure 1D:
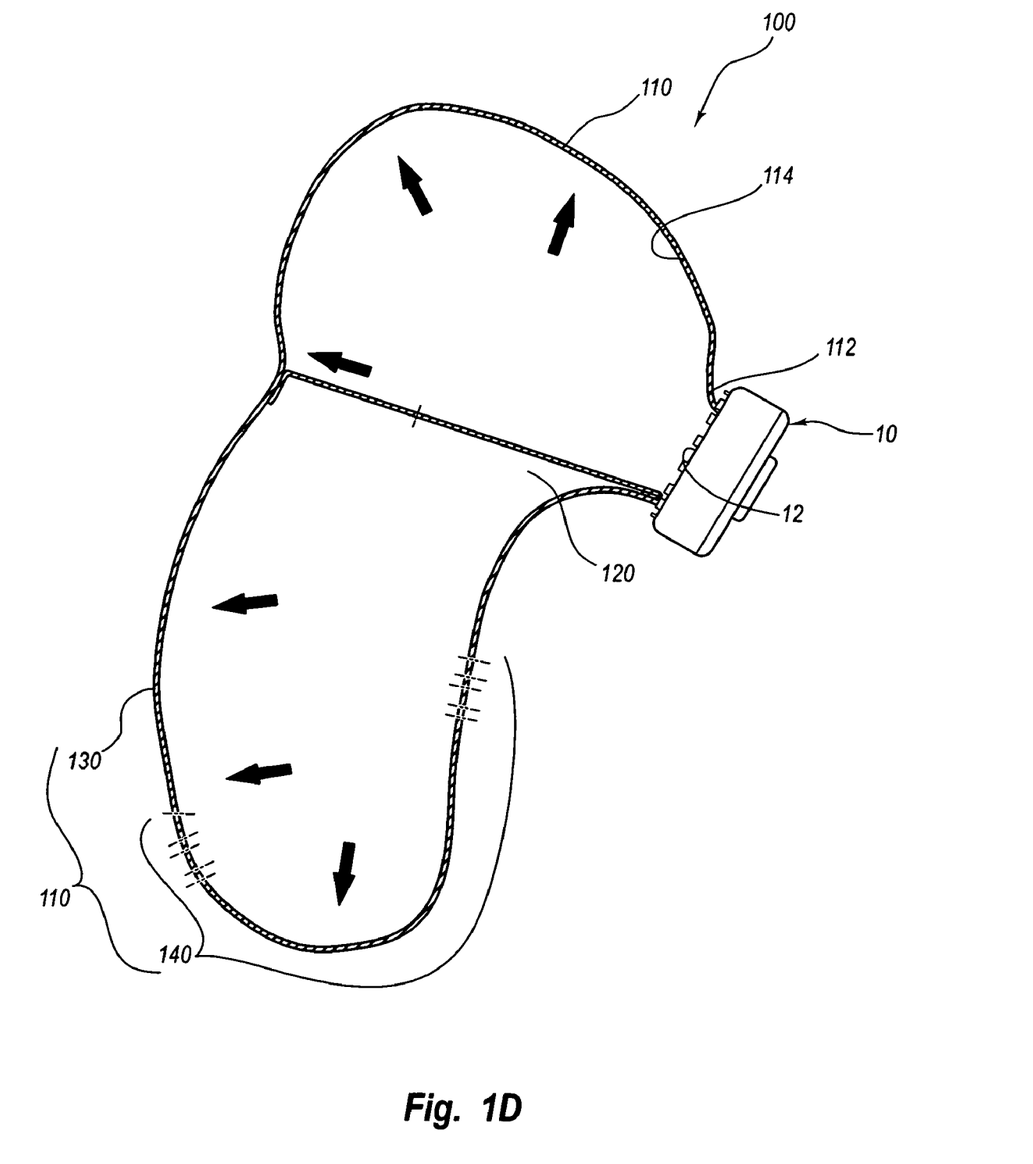
FIG. 1D is a cross-sectional view of the airbag cushion assembly shown in FIGS. 1A-1C assembly showing the expansion of the bag after the break stitches have been broken.

FIG. 1D shows airbag cushion 100 fully expanded after stitches 150 have been broken. Tether 160 remains taut. Note that expansion of full expansion section 140 also moves initial expansion section 130. The importance of the deployment sequence of the various portions of initial expansion section 130 and full expansion section 140 are best appreciated with reference to FIGS. 2A-D, FIGS. 3A-3F, and FIGS. 4A-4C.

Figure 2A:
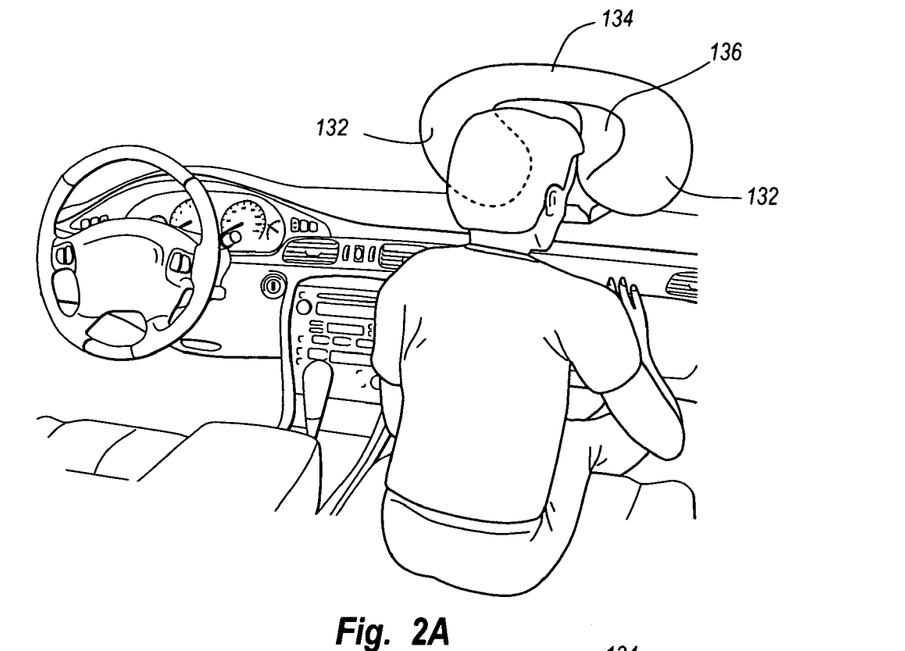
FIG. 2A is a perspective view of one embodiment of the airbag cushion deploying from the instrument panel during the initial stages of deployment.

FIG. 2A shows the initial expansion of airbag cushion 100 out of an instrument panel of an automobile. The initial expansion has a generally U-shaped configuration due to the retention of portions of cushion wall 110 before break stitches 150 (not shown in FIG. 2A) and tether stitches 166a-b (not shown in FIG. 2A) have been broken. Before stitches 166a-b of tether 160 (not shown in FIG. 2A) have been broken, portions of cushion wall 110 have different functions. Side portions 132 are located on each side of a center portion 136 and top portion 134 and bottom portion 138 which are the regions respectively located above and below center portion 136. Before tether 160 expands, it causes the formation of a depression at center portion 136. As shown, the depression at center portion 136 corresponds with the likely location of the head of an occupant who is situated out-of-position and too close to the instrument panel. As also seen in FIG. 4A, the initial expansion of shoulder portions 142 before center portion 136 protects head 30 of the occupant 30. It should be noticed that while center portion 136 and stitched area 146 (described below with reference to FIG. 2B) are respectively partially inflated and collapsed to create the U-shaped inflation pattern, top portion 134 is fully inflated.

Figure 2B:
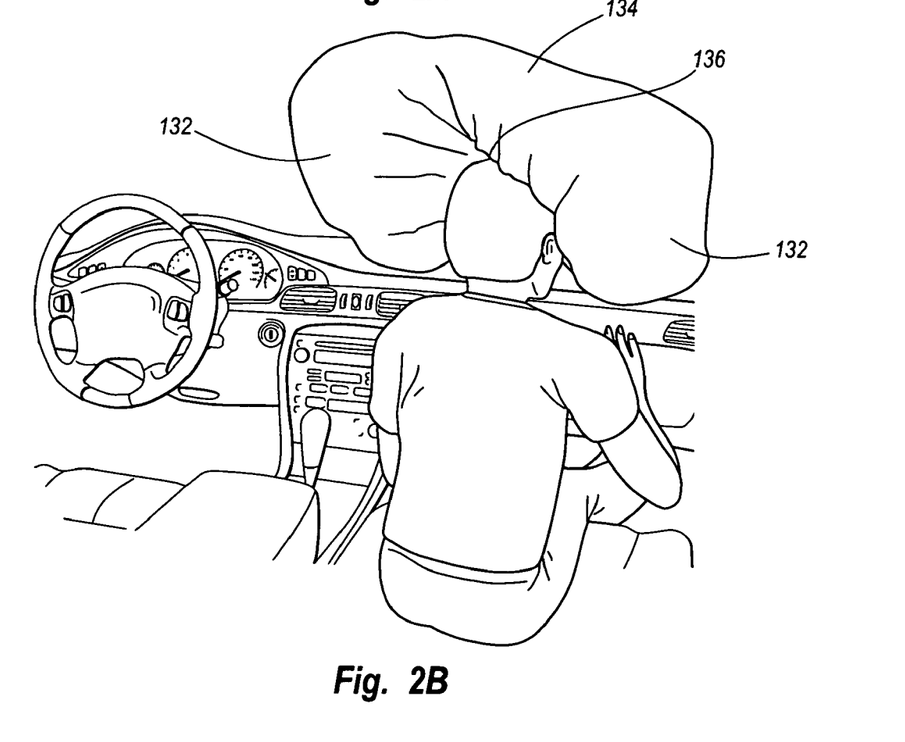
FIG. 2B is a perspective view of the airbag cushion of FIG. 2A showing the top portion of the bag filled with inflation gas.

FIG. 2B shows airbag cushion 100 after tether stitches 166a-b (not shown in FIG. 2B) have been broken to permit tether 160 (not shown in FIG. 2B) to expand to its full length. Expansion of tether 160 enables center portion 136 to be filled with gas so that it is no longer depressed.

Figure 2C:
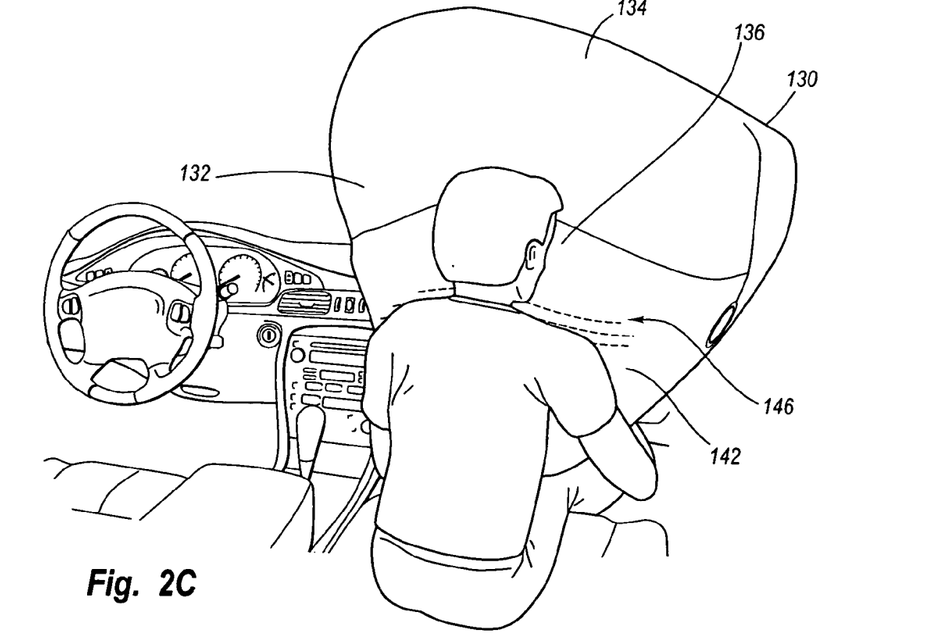
FIG. 2C is a perspective view of the airbag cushion of FIGS. 2A and 2B after the tether and break stitches have been broken.

FIG. 2C depicts the further expansion of airbag cushion 100 after break stitches 150 have been broken. Full expansion section has shoulder portions 142 which are folded but are not stitched. Folds are held in a folded configuration by a pattern of stitches through stitched area 146. More specifically, the cushion is shown after initial expansion of the airbag to illustrate the contact with the shoulders and the recessed area opposing the occupant's head.

Figure 2D:
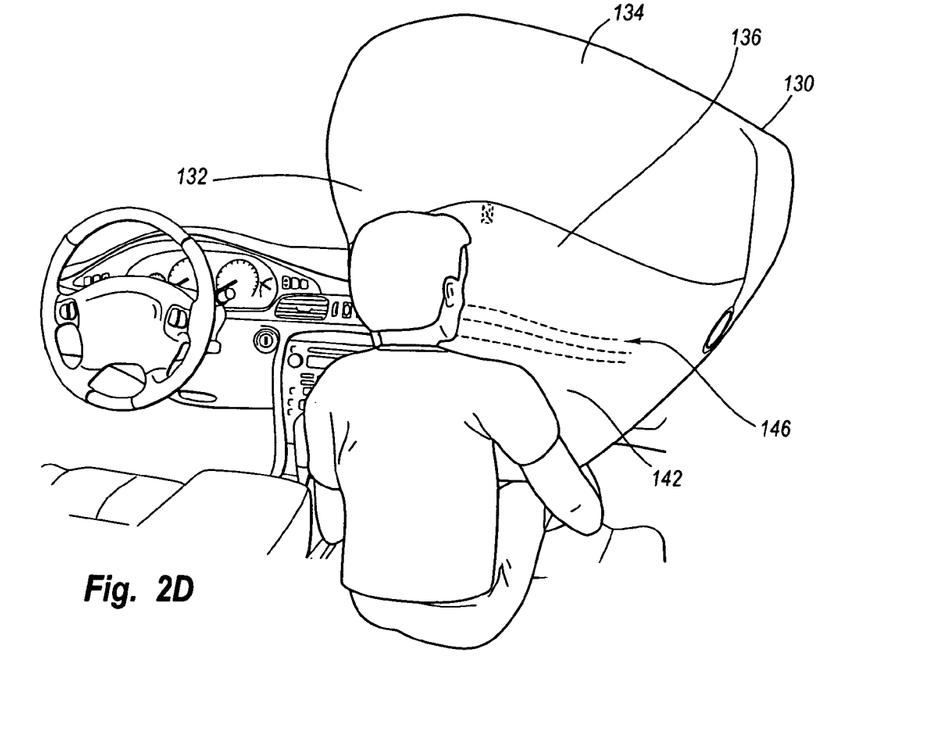
FIG. 2D is a perspective view of the airbag cushion of FIGS. 2A-2C as the airbag pushes the out-of-position occupant away from the instrument panel.

FIG. 2D depicts the final expansion of airbag cushion 100 after break stitches 150 have been broken and the cushion pushes the occupant away from the instrument panel. As indicated above, center portion 136 corresponds approximately with the likely location of an occupant's head. Stitched area 146 is located to correspond approximately with an area extending from an occupant's chin to mid-chest, essentially the occupant's upper chest. The continued expansion of full expansion section 140 enables airbag cushion to be expanded towards the occupant's abdomen.

A single load occurs when airbag cushion 100 rebounds back from the momentum of airbag cushion 100 coming out of inflator module 10. The stitching on tether 160 absorbs some of the energy of the snap load. The airbag pressure can then break stitches 150 instead of the snap load. So in one embodiment, tether stitches 166a-b are designed to break and allow the release of tether 160 before the pressure of the gas causes break stitches 150 to be broken. Of course, other embodiments may have other configurations which permit other sequences. In one embodiment, the sequences shown in FIGS. 2A-2D occur within 15 milliseconds, 20 milliseconds, 25 milliseconds and 45 milliseconds of an airbag deployment.

Figures 3A, 3B:
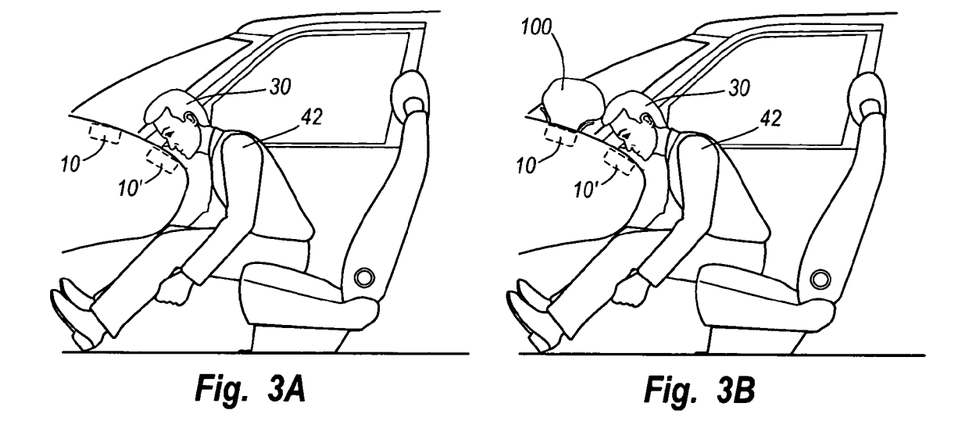
FIG. 3A is a side elevation view of another embodiment of the airbag cushion assembly before deployment with an out-of-position occupant.
FIG. 3B is a side elevation view of the airbag cushion assembly of FIG. 3A as the airbag cushion is initially deploying from the instrument panel.

Referring collectively to FIGS. 3A-3F, the out-of-position occupant's head 30 is shown adjacent the instrument panel and directly above the in-position airbag module 10'. The out of position airbag module 10 is activated during a collision event and the airbag deploys out of the instrument panel as shown in FIG. 3B.

Figure 3C:
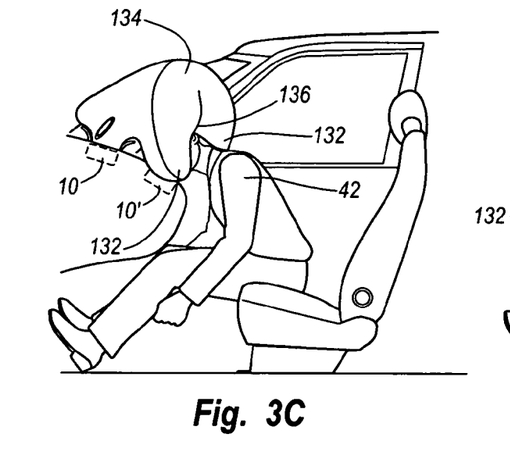
FIG. 3C is a side elevation view of the airbag cushion assembly of FIGS. 3A and 3B showing the top portion of the bag filled with inflation gas.

As shown in FIG. 3C, the initial expansion of the airbag cushion 100 has a generally U-shaped configuration due to the retention of portions of cushion wall 110 before break stitches 150 (not shown) and tether stitches 166a-b (not shown) have been broken. Side portions 132 are located on each side of a center portion 136 which receives the occupant's head 30. Top portion 134 and bottom portion 138 are the regions respectively located above and below center portion 136.

Before tether 160 expands, it causes the formation of a depression at center portion 136. As shown, the depression at center portion 136 corresponds with the likely location of the head of an occupant who is situated out-of-position and too close to the instrument panel.

Figure 3D:
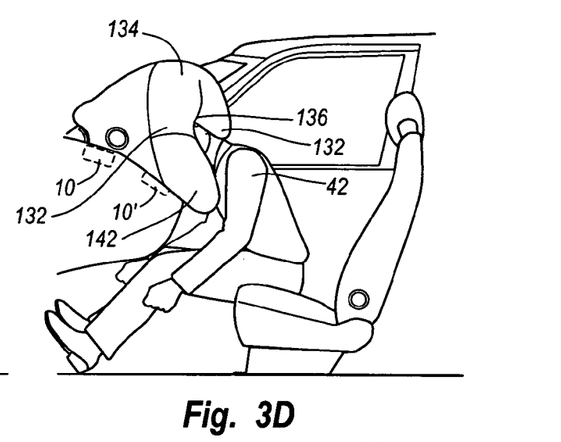
FIG. 3D is a side elevation view of the airbag cushion assembly of FIGS. 3A-3C after the internal tether stitches have been broken.

FIG. 3D shows airbag cushion 100 after tether stitches 166a-b (not shown in FIG. 3D) have been broken to permit tether 160 (not shown in FIG. 3D) to begin to expand to its full length. Expansion of tether 160 enables center portion 136 to be filled with gas so that it is no longer depressed.

Figure 3E:
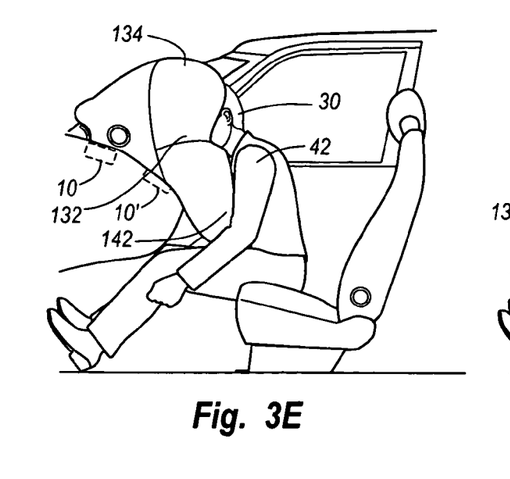
FIG. 3E is a side elevation view of the airbag cushion assembly of FIGS. 3A-3D showing the expansion of the bag after the break stitches have been broken.

FIG. 3E depicts the further expansion of airbag cushion 100 after break stitches 150 (not shown) have been broken. The rupturing of the break stitches enable the shoulder portions 142 to engage the shoulder 42 and abdomen of the out-of-position occupant.

Figure 3F:
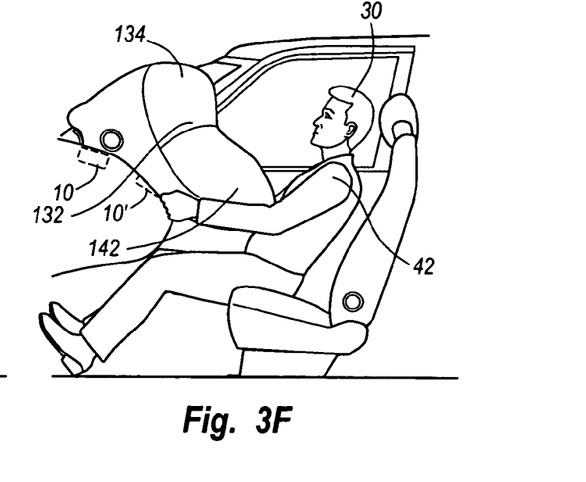
FIG. 3F is a side elevation view of the airbag cushion assembly of FIGS. 3A-3E as the airbag cushion pushes the out-of-position occupant away from the instrument panel.

FIG. 3F depicts the final expansion of airbag cushion 100 after break stitches 150 have been broken and the cushion pushes the occupant away from the instrument panel.

FIG. 4A depicts a view of an airbag cushion before stitches 150 have been broken. In the depicted embodiment, stitches 150 comprise multiple rows of stitches so that the release of energy is sequential rather than all at once. As referenced above, stitches 150 do not extend all the way across the bag. For example, the stitches may not exceed about 150 mm in one embodiment to ensure side portions 142 expand before stitched area 146.

The overall strength of the break stitch 150 is impacted by the combination of the thread strength, stitch count, and length. In some embodiments, a more consistent break stitch failure point is reached with a lower tensile thread. The airbag cushion 100 has shoulder portions 142 which are folded but are not stitched.

Some embodiments feature a stitch count in a range of about 15 to about 25 stitches per 100 mm. In another embodiment, the stitch count is about 20 stitches per 100 mm. A row of break stitches may be straight or have other configurations such as a curved configuration.

In one embodiment, the length of the stitches ranges from about 240 mm to about 390 mm. In another embodiment, the length of the longest stitch is no more than about 370 mm. The threads are located an appropriate length away from exit port 12.

As is seen in FIGS. 4B and 4C, breaking tether stitches 166a-b (not shown) to release tether 160 (not shown) enables head 30 of the occupant to be pushed back after shoulders 42 of the occupant have been pushed back by shoulder portions 142.

The stitching pattern may further enhance certain desirable inflation characteristics. For example, the timing of the delay of expansion of full expansion section 140 may be tuned by altering the strength and position of the stitching. Moreover, the stitching may be designed such that unstitched sides of the airbag cushion which inflate first causing the stitch to fail from the sides towards the center.

Figure 5:
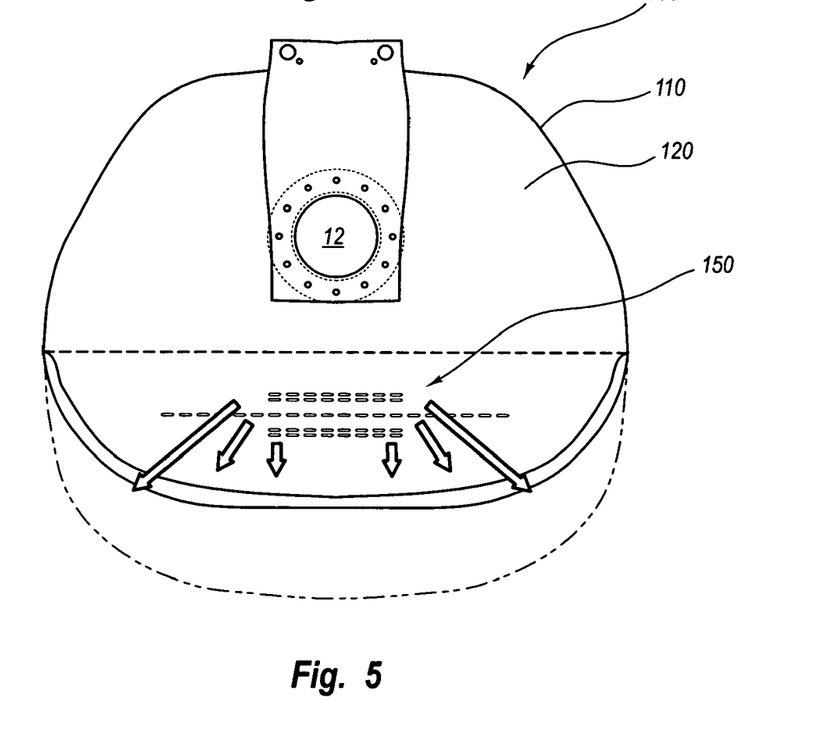
FIG. 5 is a top plan view of one embodiment of the pattern of the stitches in the airbag cushion before assembly.
Figure 6:
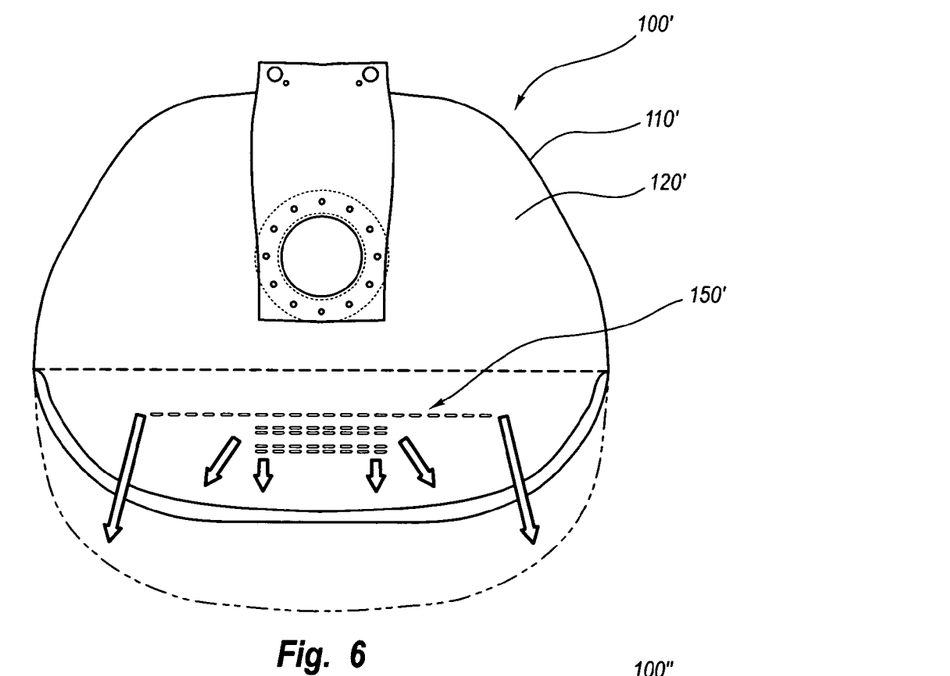
FIG. 6 is a top plan view of another embodiment of the pattern of stitches in the airbag cushion before assembly.
Figure 7:
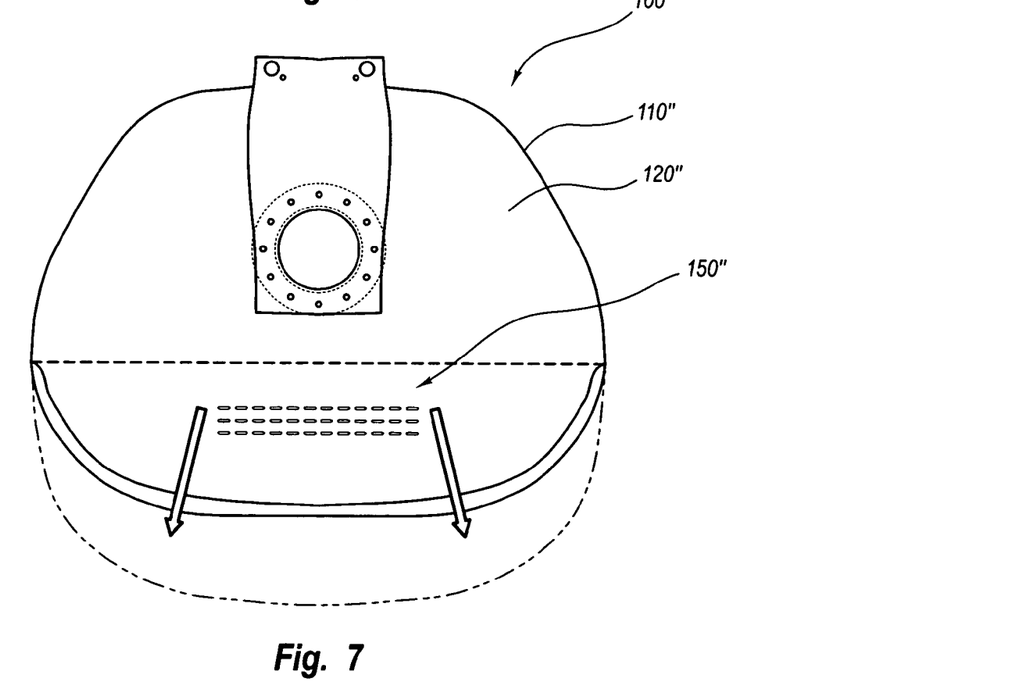
FIG. 7 is a top plan view of yet another embodiment of the pattern of stitches in the airbag cushion before assembly.

FIG. 5 shows an airbag assembly 100 with a stitch pattern 150 according to one embodiment from a top plan view. The stitch pattern 150 depicted corresponds with the embodiments heretofore described in FIGS. 1A-4C. FIG. 6 shows an alternative embodiment of an airbag assembly 100' from a top plan view. This particular embodiment demonstrates an alternative stitch pattern 150'. FIG. 7 represents yet another alternative embodiment of an airbag assembly 100" from a top plan view. The embodiment depicted illustrates an alternative stitch pattern 150" compared to those described herein.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. An airbag cushion comprising:
an airbag cushion wall enclosing an interior for inflation by gas from an inflator, said airbag cushion wall defining a throat for flow of gas from an inflator into the interior of the airbag cushion, said airbag cushion comprising an initial expansion section and a full expansion section,
wherein the initial expansion section is available for contributing to an initial volume of the interior of the airbag cushion,
wherein the full expansion section is an integral extension of the initial expansion section and is initially held in a folded configuration by at least one row of break stitches so that the full expansion section does not contribute to the initial volume of the interior of the airbag cushion but does contribute to the final volume capacity of the interior of the airbag cushion once sufficient pressure has been applied to the airbag cushion by the gas to break the break stitches,
wherein the break stitches extend only partially across the airbag cushion, and
wherein the airbag cushion has sides and the break stitches are located away from the sides of the airbag cushion so that the sides are expanded before the portion of the airbag cushion held by the break stitches.

2. The airbag cushion of claim 1, comprising a tether within the interior of the airbag cushion.

3. The airbag cushion of claim 2, wherein the tether is held by tether stitches so that the tether has an initial length and then an extended length after the stitches have been ruptured.

4. The airbag cushion of claim 3, wherein the tether is attached in a configuration which causes a depression to be formed within the initial expansion section while permitting portions on the sides of the initial expansion section to fully deploy.

5. The airbag cushion of claim 4, wherein the tether stitches are designed to rupture before the break stitches holding the full expansion section so that the initial expansion section further expands before the full expansion section expands.

6. The airbag cushion of claim 1, wherein the break stitches comprise multiple rows of stitches.

7. An airbag cushion comprising:
an airbag cushion wall enclosing an interior for inflation by gas from an inflator, said airbag cushion wall defining a throat for flow of gas from an inflator into the interior of the airbag cushion, said airbag cushion comprising an initial expansion section and a full expansion section,
wherein the initial expansion section is available for contributing to an initial volume of the interior of the airbag cushion,
wherein the full expansion section is an integral extension of the initial expansion section and is initially held in a folded configuration by at least one row of break stitches so that the full expansion section does not contribute to the initial volume of the interior of the airbag cushion but does contribute to the final volume capacity of the interior of the airbag cushion once sufficient pressure has been applied to the airbag cushion by the gas to break the break stitches,
wherein the initial expansion section and the full expansion section sequentially deploy in a manner such that the airbag cushion initially expands to each side of the occupant's head and toward the occupant's shoulders and then extends downward in front of the occupant's chest.

8. The airbag cushion of claim 7, wherein the airbag cushion is configured to expand toward the occupant's head after expanding above the occupant's head and to each side of the occupant's head.

9. The airbag cushion of claim 7, wherein the airbag cushion is configured such that initially it only partially expands at its center to avoid fully impacting the head of an occupant who may be out-of-position and such that the sequential deployment of the sections of the airbag pushes an out-of-position occupant back toward the occupant's seat with a sequential movement.

10. The airbag cushion of claim 7, wherein airbag cushion is configured such that the sequential deployment of the sections of the airbag pushes an out-of-position occupant back toward the occupant's seat by first pushing against the occupant's shoulders followed by expansion downward in front of the occupant's chest and such that the airbag does not fully deploy at its center until the out-of-position occupant has been pushed back toward the occupant's seat to minimize the impact of the airbag cushion against the occupant's head.

11. The airbag cushion of claim 7, wherein the break stitches comprise multiple rows of stitches.

12. The airbag cushion of claim 7, wherein the break stitches extend only partially across the airbag cushion.

13. An airbag cushion comprising:
an airbag cushion wall enclosing an interior for inflation by gas from an inflator, said airbag cushion wall defining a throat for flow of gas from an inflator into the interior of the airbag cushion, said airbag cushion comprising an initial expansion section and a full expansion section,
wherein the initial expansion section is above the full expansion section that once the airbag cushion is deployed,
wherein the initial expansion section is available for contributing to an initial volume of the interior of the airbag cushion, wherein the full expansion section is an integral extension of the initial expansion section and is initially held in a folded configuration by at least one row of break stitches so that the full expansion section does not contribute to the initial volume of the interior of the airbag cushion but does contribute to the final volume capacity of the interior of the airbag cushion once sufficient pressure has been applied to the airbag cushion by the gas to break the break stitches, and a tether within the interior of the airbag cushion which has tether stitches so that the tether has an initial length and then an extended length after the stitches have been ruptured wherein the tether stitches are designed to rupture before the break stitches holding the full expansion section so that the initial expansion section further expands before the full expansion section expands.

14. The airbag cushion of claim 13, wherein the airbag cushion has sides and the break stitches are located away from the sides of the airbag cushion so that the sides are expanded before the portion of the airbag cushion held by the break stitches.

15. The airbag cushion of claim 13, wherein the tether is positioned so that a center area of the initial expansion section only partially expands and then fully expands once the tether stitches have been ruptured.

16. The airbag cushion of claim 13, wherein the tether is attached in a configuration which causes a depression to be initially formed within the initial expansion section while permitting portions on the sides of the initial expansion section to fully deploy.

17. The airbag cushion of claim 13, wherein the break stitches comprise multiple rows of stitches.

18. airbag cushion of claim 13, wherein the break stitches extend only partially across the airbag cushion.

* * * * *